US008655985B2

(12) United States Patent
De et al.

(10) Patent No.: US 8,655,985 B2
(45) Date of Patent: Feb. 18, 2014

(54) CONTENT DELIVERY USING MULTIPLE SOURCES OVER HETEROGENEOUS INTERFACES

(75) Inventors: Pradipta De, New Delhi (IN); Nikhil Jain, New Delhi (IN); Shivkumar Kalanaraman, Bangalor (IN); Venkateswara R. Madduri, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/946,829

(22) Filed: Nov. 15, 2010

(65) Prior Publication Data

US 2012/0124173 A1  May 17, 2012

(51) Int. Cl.
*G06F 15/16* (2006.01)

(52) U.S. Cl.
USPC ............................ 709/219; 709/202; 709/206

(58) Field of Classification Search
None
See application file for complete search history.

(56) References Cited

U.S. PATENT DOCUMENTS

| 6,697,365 | B1 * | 2/2004 | Messenger | 370/390 |
| 7,447,242 | B2 * | 11/2008 | Geagan et al. | 370/538 |
| 2002/0069241 | A1 * | 6/2002 | Narlikar et al. | 709/203 |
| 2003/0188085 | A1 * | 10/2003 | Arakawa et al. | 711/100 |
| 2005/0286466 | A1 * | 12/2005 | Tagg et al. | 370/329 |
| 2007/0174471 | A1 * | 7/2007 | Van Rossum | 709/229 |
| 2008/0037438 | A1 | 2/2008 | Twiss et al. | |
| 2008/0133538 | A1 | 6/2008 | Chavez et al. | |
| 2009/0319502 | A1 | 12/2009 | Chalouhi et al. | |
| 2011/0038483 | A1 * | 2/2011 | Goeller et al. | 380/282 |

FOREIGN PATENT DOCUMENTS

WO  WO2010069864 A1  6/2010

OTHER PUBLICATIONS

Caelsson et al., "Peer-assisted On-demand Streaming of Stored Media Using Bit Torrent-like Protocols." Proc. IFIP/TC6 Networking '07, May 2007.
Bellissimo et al., "Exploring the Use of BitTorrent as the Basis for a Large Trace Repository," Department of Computer Science, University of Massachusetts, Amherst, MA 01003, not dated.
Guo et al., "A Performance Study of BitTorrent-like Peer-to-Peer Systems," IEEE Journal on Selected Areas in Communications, vol. 25, No. 1, Jan. 2007.

* cited by examiner

*Primary Examiner* — Lynn Feild
*Assistant Examiner* — Keyvan Emdadi
(74) *Attorney, Agent, or Firm* — Danile E. Johnson; Gregory K. Goshorn; Greg Goshorn, P.C.

(57) ABSTRACT

Provided is a system for the distribution of data, comprising a data server comprising a processor, a computer-readable storage medium coupled to the data server, a plurality of proxy servers, each with a plurality of network interfaces, a file of digital content, comprising a plurality of chunks, wherein copies of each chunk are stored on two or more of the proxy servers and the digital server; and logic, stored on the computer-readable storage medium and executed on the processor, for receiving a request for the digital file from a client device, for generating a proxy list for each chunk, comprising information identifying the two or more proxy servers on which the copies of the chunks are stored, and information corresponding to network interfaces associated with the two or more proxy servers on which the copies are stored; and for transmitting the proxy list to the client device to enable the client device to select two or more proxy servers on which the copies are stored and simultaneously download the two or more of the chunks utilizing two or more proxy servers and two or more network interfaces.

14 Claims, 5 Drawing Sheets

CONTENT DELIVERY USING MULTIPLE SOURCES OVER HETEROGENEOUS INTERFACES

FIELD OF DISCLOSURE

The claimed subject matter relates generally to content delivery and, more specifically, to the delivery of content to a requesting device simultaneously over multiple interfaces.

SUMMARY

As computers have become smaller and cheaper, smart devices, such as application telephones, laptop computers and many types of mobile computing devices, have become ubiquitous. In addition, many computing devices incorporate multiple interfaces such as Infra-Red, Bluetooth, Wimax(4G) and Ethernet. Such devices typically download content such as applications, music, videos and ring tones. As more and more content is downloaded to the increasing number of devices, the same content is often loaded by the many different devices, each with potentially multiple network interfaces. For example, a popular YouTube video may be downloaded by thousands of devices.

Provided is a system for the distribution of data, comprising a data server with a processor; a computer-readable storage medium coupled to the data server; a plurality of proxy servers, each proxy server comprising a plurality of network interfaces; a file of digital content, comprising a plurality of chunks, wherein a plurality of copies of a particular chunk are stored on two or more of the plurality of proxy servers and the digital server; and logic, stored on the computer-readable storage medium and executed on the processor, for receiving a request for the digital file from a client device; generating a proxy list for the file, the proxy list comprising: information identifying the two or more proxy servers on which copies of the plurality of chunks are stored; and information corresponding to network interfaces associated with the two or more proxy servers on which the copies are stored; and transmitting the proxy list to the client device to enable the client device to select, for each chunk of the plurality of chunks, a corresponding proxy server of the plurality of proxy server and concurrently download the plurality chunks using two or more network interfaces, wherein each chunk is downloaded via the corresponding selected proxy server.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for distribution of data. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely, on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As the Inventors herein have realized, a system is needed can increase the number of content downloads for a service provider while reducing the load on the service provider's infrastructure, reducing downtime, reducing the cost of a download, increasing the number of sources for a download, increasing the revenue of a service provider and reducing end user cost. These benefits are achieved by enabling a service provider to provide smart content downloads at end user devices and by providing end hosts with information necessary for discover requested content from peer devices. Also provide are techniques for end hosts to optimize the cost and speed of a download by providing a list of peers and corresponding constraints from which content can be downloaded. In addition, a revenue sharing model is provided that cans into consideration multiple peers acting as proxy providers.

Figure 1:
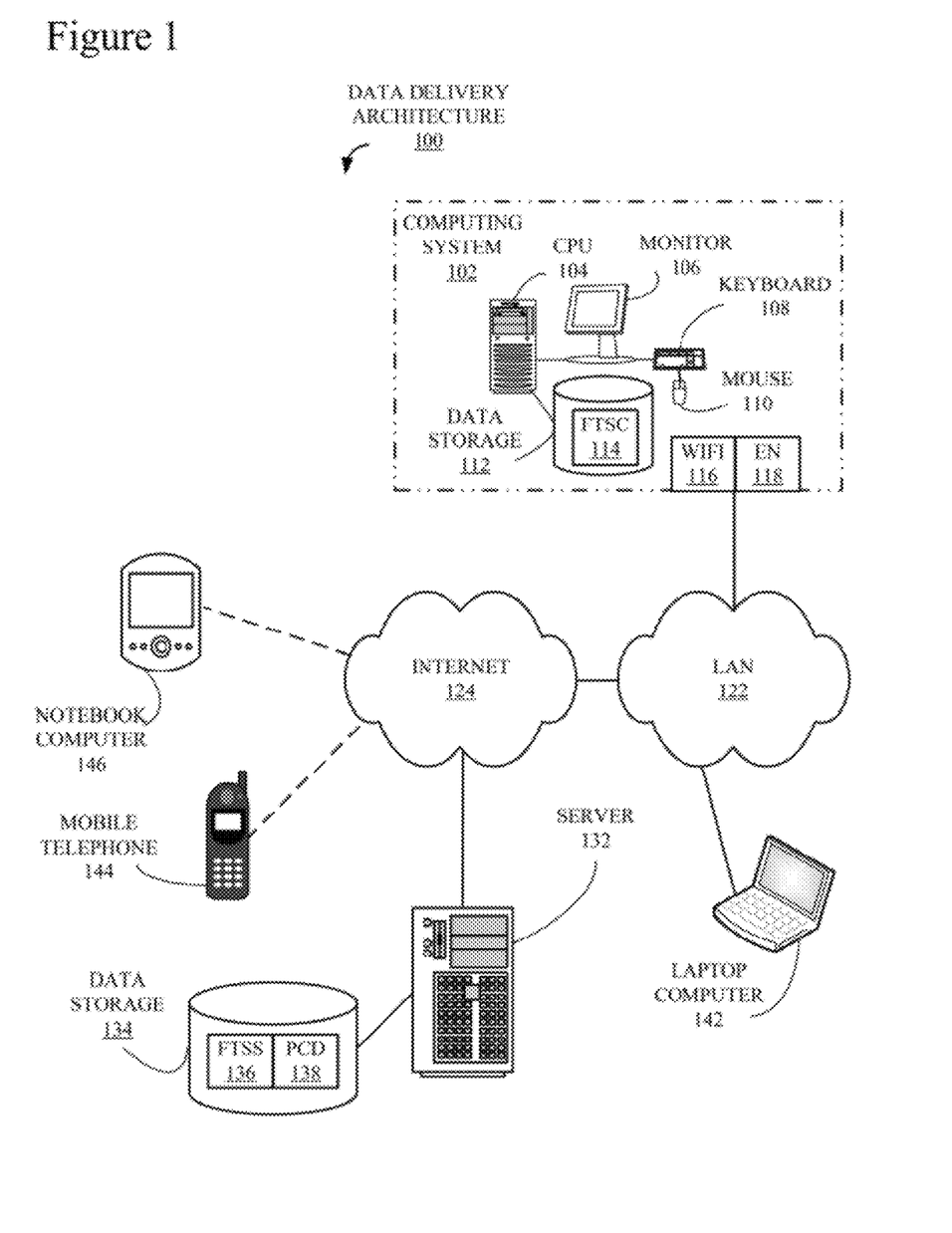
FIG. 1 is a content delivery architecture that is one example of a network that may implement the claimed subject matter.

Turning now to the figures, FIG. 1 is an example of a data, or content, delivery architecture 100 that may implement the claimed subject matter. A computing system 102 includes a central processing unit (CPU), or processor, 104, coupled to a monitor 106, a keyboard 108 and a mouse 110, which together facilitate human interaction with computing system 102. Also included in computing system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing a Fast Track System Client application (FTSC) 114 that implements portions of the claimed subject matter.

Computing system 102 and CPU 104 are connected to a local area network (LAN) 122, which is connected to the Internet 124, which provides access for computing system 102 to a data server 132. In this example computing system 102 has two (2) types of network connections, i.e. a WiFi connection 116 and an ethernet (EN) connection 118. Throughout the Specification, connections 116 and 118 are used to describe the claimed subject matter and it should be understood that computing system 102 could have other types of network connections. Further, other illustrated devices may have multiple network connections of different types.

Like computing system 102, server 132 would typically include a CPU, monitor, keyboard and mouse but for the sake of simplicity these are not illustrated. Attached to server 132 is a data storage component 134, which may either be incorporated into server 132 i.e. an internal device, or attached externally to server 132 by means of various, commonly available connection devices such as but not limited to, a universal serial bus (USB) port (not shown). Data storage 134 is illustrated storing a Fast Track System Server application (FTSS) 136 that implements portions of the claimed subject matter. Coupled to FTSS 136 is a proxy and content directory (PCD) 138. PCD 138 stores information for server side content management, including meta-tags to identify file, divided into chunks, with potentially different encoding and a mapping of file chunks to proxy servers, or peers. FTSC 114, FTSC 136 and PCD 138 are explained in more detail below in conjunction with FIGS. 2-5.

Although in this example computing system 102 and server 132 are communicatively coupled via LAN 122 and Internet 124, they could also be coupled through any number of communication mediums. Also connected to Internet 124 are examples of several devices that may download content or data via data delivery architecture 100. Devices included in this example are a laptop computer 142, a mobile telephone 144 and a notebook computer 146. Laptop computer 143 is coupled to LAN 122 and mobile telephone 144 and notebook 146 are coupled to Internet 124. Dotted lines between Internet 124 and device 144 and 146 indicate that, in this example, these particular connections are wireless. It should be noted there are many possible data delivery architectures, of which data delivery architecture 100 is only one simple example used to illustrate the claimed subject matter.

Figure 2:
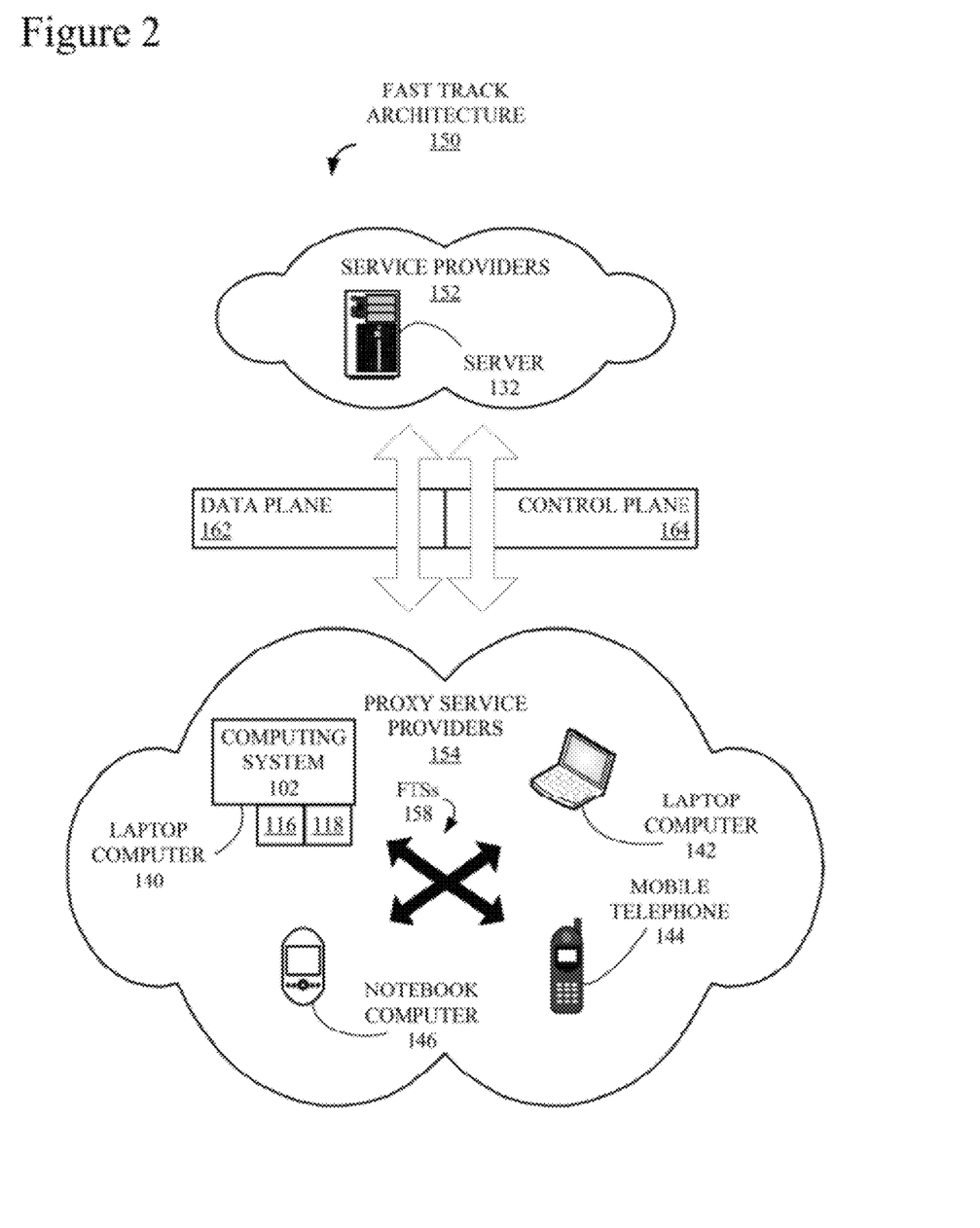
FIG. 2 is a block diagram of a Fast Track architecture that represents one implementation of the claimed subject matter.

FIG. 2 is a block diagram of a Fast Track architecture 150 that represents one implementation of the claimed subject matter. Devices are two (2) domains, i.e. a service provider domain, or service providers, 152 and a proxy service provider domain, or proxy service providers, 154. In this example, server 132 (FIG. 1) is in service providers 152 and computing system 102 (FIG. 1), laptop computer 142 (FIG. 1), mobile telephone 144 (FIG. 1) and notebook computer 146 (FIG. 1) are in proxy service providers 154. Although not shown, other devices that are not in either service providers 152 or proxy service providers 154 may also take advantage of the disclosed techniques. For example, a device may employ the techniques to speed the downloading of data although not configured to participate as a proxy server.

Between service providers 152 and proxy service providers 154 are a data plane 162 and a control plane 164, which provide the interfaces between domains 152 and 154. In general, data plane 162 is responsible for proxy discovery, including proxy selection by servers and clients, and scheduling. Control plane 164 is responsible for PCD 138 (FIG. 1) maintenance and enabling encodings. Control plane 164 may also include logic for generating a file chunk-to-proxy mapping, adding new proxies to proxy service providers 154, and removing and maintaining proxy servers in proxy service providers 154. In addition, control plane 164 may be responsible for encoding matching and channel interference avoidance.

Also shown in FIG. 2, are file transfer streams 158, which represent the many connections that may provide data transfer between devices. For example, one particular file transfer stream may provide data from mobile telephone 144 (FIG. 1) to computing system 102 via WiFi connection 116 (FIG. 1) and another connection may provide data transfer from laptop computer 142 to computing system 102 via Ethernet connection 118.

The disclosed techniques provide a method for content download optimization using user-driven parameters such as, but not limited to, download time and cost. In other words, the disclosed techniques enable maximum utilization of available bandwidth. Data plane 162 and control plane 164 are described in more detail below in conjunction with FIGS. 3-5.

Figure 3:
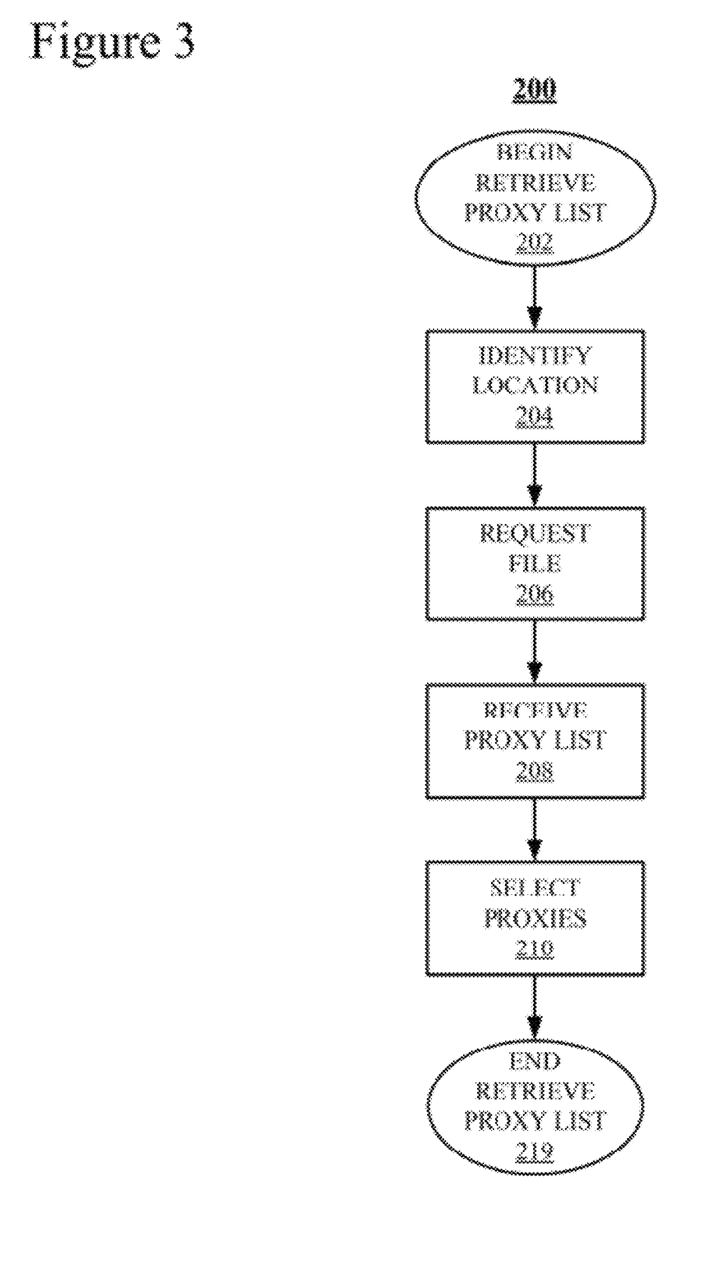
FIG. 3 is a flowchart of a Retrieve Proxy List process that may implement aspects of the claimed subject matter.

FIG. 3 is a flowchart of a Retrieve Proxy List process 200 that may implement aspects of the claimed subject matter. In this example, process 200 is stored on data storage 112 for computing system 102 as part of FTSC 114, all of which are described above in conjunction with FIG. 1.

Process 200 starts in a "Begin Retrieve Proxy List" block 202 and proceeds immediately to an "Identify Location" block 204. During block 204, process 200, using data stored in FTSC 114, determines the location of a FTSS such as, in this example, FTSS 136 (FIG. 1) of server 132 (FIG. 1). Once FTSS 136 has been located, process 200 proceeds to a "Request File" block 206. During block 206, process 200 requests a list of available proxy service providers (see 154, FIG. 2), from FTSS 136 of server 132, that correspond to a desired file and potential interfaces. One example of a Request Message includes:

Message Header with an IP Address, Interface Type, Device Type, Action Bit,
Size-of-the-message; and
Pay Load with geo co-ordinates, File Chunk ID, File Name, Available Interface types code.
Action Bit—0—Information about the Specified File
Action Bit—1—Give me the Specified Chunk
Acton Bit—2—Add the seed into Seed directory
With Action Bit—0—File Chunk ID can be empty
With Action Bit—1—Available interface code can be empty A list of available proxy servers is returned during a "Receive Proxy List" block 208. The proxy list received during block 208 typically includes information concerning the chunks associated with the requested file and information about the chunks such as type of proxy interfaces and encodings available for each chunk. Information on encodings is useful because any particular device may not support all types of file encodings and converting a file from one format to another consumes resources such as CPU, battery and memory. This feature may be particularly relevant to mobile devices that typically have limited resources. This information is stored in PCD 138 on data storage 134. One example of a response message includes a Response Header with Seed Directory IP Address and Size of the payload and a Response Payload, including a File Name, Number of Chunks, File Chunk Id, Number of Seeds, IP Address, Device Type, Interface Type, geographical co-ordinates, time-to-live (TTL) data, and so on.

During a "Select Proxies" block 210, FTSC 114 selects a subset of the proxies provided in the proxy list. According to the claimed subject matter, a device, such as computing system 102, that initiates process 200 typically selects proxies for the various chunks of a requested file based upon available connections that correspond to connections of system 102 and desirable encodings. Logic associated with block 210 is described in more detail below in conjunction with FIG. 4. Finally, process proceeds to an "End Retrieve Proxy List" block 219 in which process 200 is complete.

Figure 4:
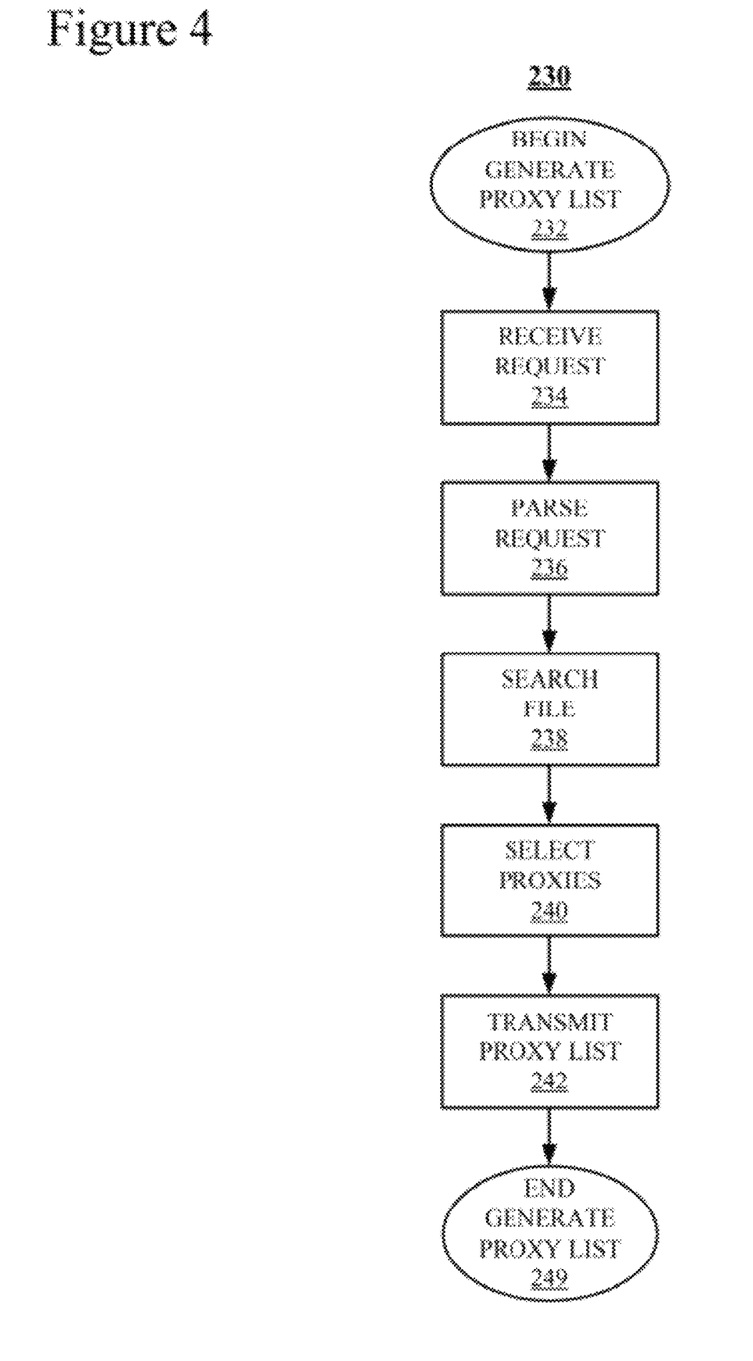
FIG. 4 is a flowchart of a Generate Proxy List process that may implement aspects of the claimed subject matter.

FIG. 4 is a flowchart of a Generate Proxy List process 230 that may implement aspects of the claimed subject matter. In this example, process 230 is stored on data storage 134 of server 132 as logic associated with FTSS 136, all of which were introduced above in conjunction with FIG. 1.

Process 230 starts in a "Begin Generate Proxy List" block 232 and proceeds immediately to a "Receive Request" block 234. During block 234, server 132 receives a request for a list of proxy candidates from, in this example, computing system 102 (see 206, FIG. 3). During a "Parse Request" block 236, process analyzes the request received during block 234 to determine such information as the source of the request and the nature of the requested content or file. Examples of constraints associated with the source include, but are not limited to, types of interfaces available, location of the requestor, acceptable encodings, whether wireless of not, and so on. Examples of constraints associated with the content include, but are not limited to, location of copies, or "seeds," acceptable encodings, size of the content, and so on.

During a "Search File" block 238, process 230 searches PCD 138 (FIG. 1) for information on possible proxy server candidates. Criteria may employ to select candidates include, but are not limited to, the proximity of the candidate to the device that submitted the request, types of file encodings available. With respect RI location, wired devices may be judged based upon a number of hops across the Internet and, with respect to wireless candidates, based upon geographical proximity. With respect to encodings, all proxies may not store requested file chunks in preferred encodings.

During a "Select Proxies" block 240, process 230 selects a subset of proxies based upon proxy characteristic information gathered during block 238. In other words, proximity and encoding criteria are applied to the set of candidates. Addition criteria may also be applied. For example, requests may be balanced across available providers to lower the number of requests to highly used proxies. In other words, the set of available proxies generated during block 238 is filtered to produce a subset of proxies that are best able to deliver the desired chunks of a file. During a "Transmit Proxy List" block 242, process 230 transmits a list with the subset of proxies generated during block 240 to the requesting client (see 208, FIG. 3). It should be understood, that in addition an identification of the proxies, each proxy in the subset would be correlated with the chunks that are available from the proxy. In other words, each proxy may not store all chunks. Finally, during an "End Generate Proxy List" block 249, process 230 is complete.

Figure 5:
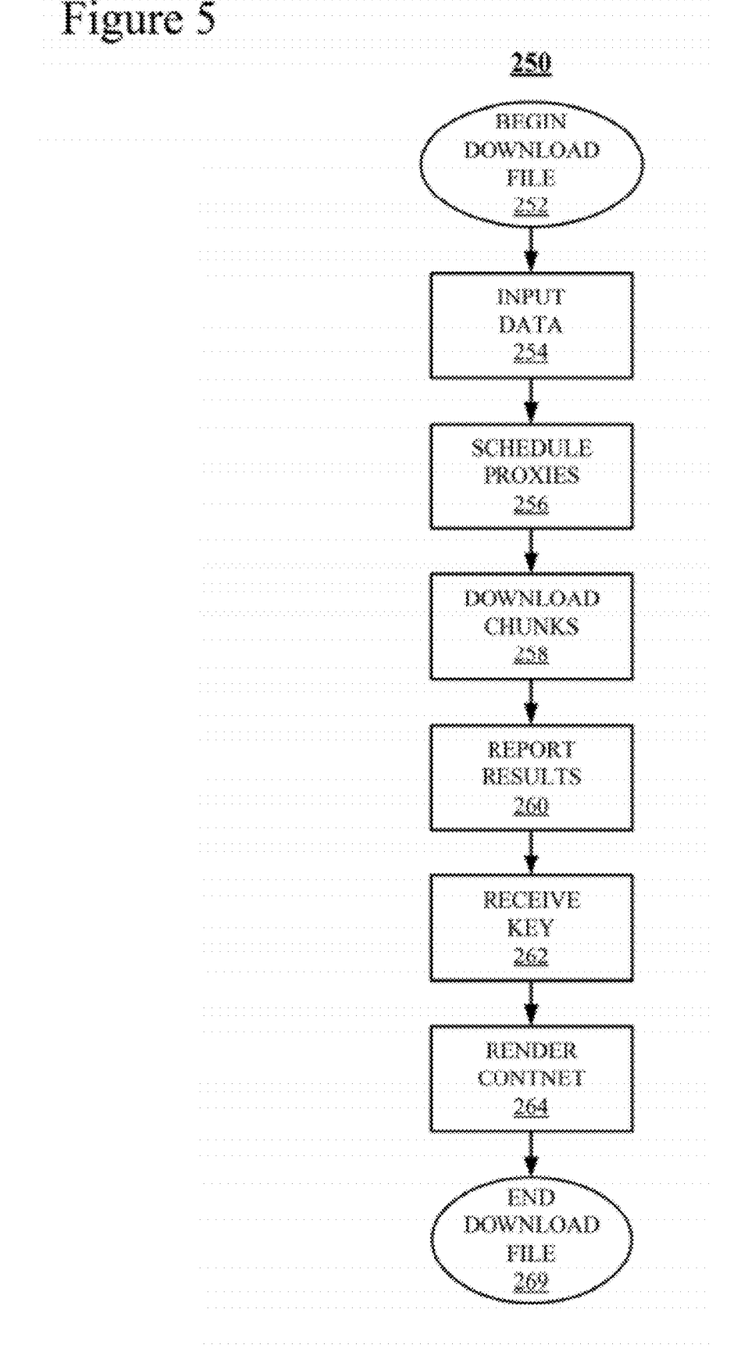
FIG. 5 is a flowchart of a Download File process that may implement aspects of the claimed subject matter.

FIG. 5 is a flowchart of a Download File process 250 that may implement aspects of the claimed subject matter (see 210, FIG. 3). Like process 200 (FIG. 3), in this example, process 250 is stored on data storage 112 for computing system 102 as part of FTSC 114, all of which are described above in conjunction with FIG. 1.

Process 250 starts in a "Begin Download File" block 252 and proceeds immediately to an "Input data" block 254. During block 254, process 250 determines from a received proxy list (see 208, FIG. 3) network details for each available interface. Detail may include, but are not limited to, available bandwidth, response time, cost per byte and battery usage. In addition to network details, information received may include optimization parameters, a chunk list, which is a list of the available chunks of data corresponding to the requested file, and a list of proxy server candidates.

During a "Schedule Proxies" block 256, process 250 decide which of the available interfaces to employ, e.g. WiFi 116 (FIG. 1) and Ethernet 118 (FIG. 1), selects proxies from the list of proxy server candidates and computes the portion of each selected network interface to employ. Other factors associated with block 256 may include item such as Share of a network is a linear weighted function of given optimization parameters.

Given a download of 'n' chunks, the attempt is to allocate share values whose sum is small compared to 'n'.

Chunks are allocated to the networks for download in proportion to their share (largest share first) in cyclic fashion.

Such a distribution guarantees optimal download speed as well as reduces the playback time.

Given a file to download and associated cost cap the scheduler may divide the chunk list and cost into 'p' groups with equal number of chunks and cost for group 1 to p, determine networks that can be used to download all the chunks independently (given the cost cap), use these networks to download chunks (using given optimization parameters) and transfer leftover cost to next group.

During a "Download Chunks" block 258, process 250 downloads the file in chunks from proxy the selected proxy server candidates using the selected interfaces. During a download, computing system 102 man periodically (using timers) detect available networks and their key characteristics, share information on chunks hosted, and recalculate network shares and check in allocation lists for chunks belonging to old networks and reassign them.

For example, consider a file consisting of 1000 chunks that is to be downloaded in Rs 1000. One technique may include:

dividing the 1000 chunks into 5 groups each having 200 chunks and Rs 200;

Start with an attempt to download group 1;

Say for group 1, following networks are available:

Lan—100 ms (rtt), Rs 0.5 per chunk';

Bluetooth—200 ms (rtt), Rs 0.25 per chunk;

GPRS—500 ms (rtt), Rs 3 per chunk;

Only Lan and Bluetooth will be used forr such downloading group 1 with share of 1:1 (given that rtt*cost is the optimization parameter);

Cost used will be Rs 75 for downloading 200 packets of group 1;

Rs 125 (leftover from group 1=200−75) will be transferred to group 2 making available cost Rs 325 for it;

Similar exercise is repeated for group 2 to group 5; and

Download complete.

During a "Report Results" block 260, process 250 outputs the downloaded chunks to computing system 102 and each proxy that provided content with results of the operation with respect to each proxy, including the number of chunks provided by each proxy, or peer. In one embodiment, each peer that acts as a proxy provider gets revenue. In addition all peers in a parent chain get a smaller share of the revenue. In this manner, revenue may be disbursed as a diminishing revenue chain up to the server provider, which in this example is server 132. For example, if computing system 102 downloads a media file having one hundred (100) chunks from two (2) peers such as laptop computer 142 (FIG. 1) and mobile telephone 144 (FIG. 1), each of computer 142 and telephone 144 receives credit for fifty (50) chucks but has to share half, or twenty-five (25), with any parent device, or a device in between the device and service provider, and so on, till it reaches the Service Provider, which in this example is server 132. With minimal resource spent, server 132 makes a profit, as well as, ensures incentive for devices 142 and 144 that share content. Once all reward points are gathered at server 132, a license key to decrypt the content downloaded in chunks during block 258 is transmitted from server 132 and received at computing system 102 during a "Receive Key" block 262. During a "Render Content" block 264, computing system 102 decrypts (if necessary), reassembles the file from the received chunks and renders the received file. Finally, during an "End Download File" block 269, process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for the distribution of data, comprising:
dividing a digital file into a plurality of chunks, wherein each chunk of the plurality of chunks is stored on one or more proxy servers of a plurality of proxy servers and at least one chuck of the plurality of chunks is stored on two or more of the proxy servers of the plurality of proxy servers;
receiving a request for the digital file from a client device;
generating a proxy list for the digital tile, the proxy list comprising:
information on the plurality of chunks and corresponding proxy servers;
information corresponding to a plurality of network interfaces associated with each of the corresponding proxy servers;
transmitting the proxy list to the client device;
selecting, by the client device, for each particular chunk of the plurality of chunks, a corresponding proxy server on the particular chunk and concurrently downloading the plurality chunks using two or more of the plurality of network interfaces, wherein each chunk is downloaded via the corresponding selected proxy server; and
distributing revenue associated with the downloading of the plurality of chunks to each selected proxy server in a proportion based upon a number of chunks downloaded from each selected proxy server.

2. The method of claim 1, further distributing a proportion of the revenue to a data server that generates the proxy list.

3. The method of claim 1, the plurality of network interfaces comprising:
a local area network;
a WiFi network;
a Bluetooth network; and
a general packet radio service (GPRS) network.

4. The method of claim 1, the generation of the proxy list, comprising filtering a list of all proxy servers of the plurality of proxy servers based upon defined criteria.

5. The method of claim 4, the defined criteria comprising as selection of possible criteria, the list including:
load balancing criteria:
geographical location criteria:
download speed criteria; and
a strength of signal criteria.

6. A method for the distribution of data, comprising:
transmitting, from a client device, a request for a digital file;
receiving, at the client device a proxy list, the proxy list comprising;
information identifying a plurality of chunks and corresponding proxy servers, wherein the plurality of chunks, taken together, store the entire digital file and each chunk comprises a potion of the digital file and at least one chunk is stored on two or more of the proxy servers;
information corresponding to a plurality of network interfaces, each proxy server associated with a corresponding subset of the plurality of network interfaces; and
selecting, for each chunk, a corresponding proxy server of the plurality of proxy servers and a corresponding subset of the plurality of network interfaces;
downloading each of the plurality of chunks via a corresponding proxy server and network interface of the corresponding subset of the plurality of network interfaces, wherein at least two chunks of the plurality of chunks are downloaded concurrently via different network interfaces;
assembling the digital file from the plurality of chunks; and
distributing revenue associate with the downloading of the plurals of chunks to each selected proxy server in a proportion based upon a number of chunks downloaded from each selected proxy server.

7. The method of claim 6, further distributing a proportion of the revenue to a data server that generates the proxy list.

8. The method of claim 6, the plurality of network interfaces comprising:
a local area network;
a WiFi network;
a Bluetooth network; and
a general packet radio service (GPRS) network.

9. The method of claim 6, wherein the proxy list is the result of a filtering of a list of all proxy servers of the plurality of proxy servers based upon defined criteria.

10. The method of claim 9, the defined criteria comprising a selection of possible criteria., the list including:
load balancing criteria;
geographical location criteria;
download speed criteria; and
a strength of signal criteria.

11. A method, comprising:
dividing a digital file into a plurality of chunks, each chunk filed on one or more proxy server of a plurality of proxy server, and wherein one particular chunk of the plurality of chunks is stored on two or more proxy servers of a plurality of proxy servers;
receiving a request for the digital file from a client device;
generating a proxy list for the digital file, the proxy list comprising:
information on the plurality of chunks and corresponding proxy servers;
information corresponding to a plurality of network interfaces associated with each of the corresponding proxy servers;
transmitting the proxy list to the client device;
selecting, by the client device, for the particular chunk of the plurality of chunks, a particular proxy server of the two or more proxy servers; and, in response to the selecting;
downloading the particular chunk via the particular proxy server; and
distributing revenue associated with the downloading of the plurality of chunks to each selected proxy server in a proportion based upon a number of chunks downloaded from each selected proxy server.

12. The method of claim 11, the plurality of network interfaces comprising:
a local area network;
a WiFi network;
a Bluetooth network; and
a general packet radio service (GPRS) network.

13. The method of claim 11, wherein the proxy list is the result of a filtering of a list of all proxy servers of the plurality of proxy servers based upon defined criteria.

14. The method of claim 11, wherein the selecting if based upon defined criteria comprising a selection of possible criteria, the selection including:
load balancing criteria;
geographical location criteria;
download speed criteria; and
a strength of signal criteria.

* * * * *